(12) United States Patent
Webb

(10) Patent No.: US 7,744,276 B2
(45) Date of Patent: Jun. 29, 2010

(54) SENSOR MEASUREMENT ERROR

(75) Inventor: Peter D Webb, Derby (GB)

(73) Assignee: Rolls-Royce PLC, London (GB)

( * ) Notice: Subject to any disclaimer, the term of this patent is extended or adjusted under 35 U.S.C. 154(b) by 134 days.

(21) Appl. No.: 11/481,092

(22) Filed: Jul. 6, 2006

(65) Prior Publication Data

US 2007/0025412 A1 Feb. 1, 2007

(30) Foreign Application Priority Data

Jul. 30, 2005 (GB) .................................. 0515715.1

(51) Int. Cl.
G01K 7/00 (2006.01)
G01K 15/00 (2006.01)

(52) U.S. Cl. ..................... 374/179; 374/57; 374/1; 374/170; 374/4; 136/200; 702/99

(58) Field of Classification Search .............. 374/1, 374/2, 179, 4, 57, 163, 183, 170–173, 100, 374/102–103, 112, 110, 43–45; 702/99, 702/130–136; 136/200; 327/512–513
See application file for complete search history.

(56) References Cited

U.S. PATENT DOCUMENTS

| | | | | |
|---|---|---|---|---|
| 3,504,522 A | * | 4/1970 | Jasik et al. ................ 374/1 |
| 3,574,282 A | * | 4/1971 | Curwen ................ 73/112.01 |
| 3,961,325 A | * | 6/1976 | Kendall et al. ............. 341/120 |
| 4,016,557 A | * | 4/1977 | Zitelli et al. .............. 341/139 |
| 4,122,720 A | | 10/1978 | Podl |
| 4,211,113 A | * | 7/1980 | Harrison ................ 374/170 |
| 4,293,916 A | * | 10/1981 | Del Re et al. ............. 703/6 |
| 4,483,299 A | | 11/1984 | Otobe et al. |
| 4,483,631 A | * | 11/1984 | Kydd ................ 374/141 |
| 4,532,601 A | * | 7/1985 | Lenderking et al. ........... 702/99 |
| 4,590,472 A | * | 5/1986 | Benson et al. ......... 340/870.04 |
| 4,895,454 A | * | 1/1990 | Kammleiter et al. ........ 374/163 |
| 4,901,061 A | * | 2/1990 | Twerdochlib ............. 340/604 |
| 5,261,747 A | * | 11/1993 | Deacutis et al. ........... 374/137 |
| 5,663,899 A | * | 9/1997 | Zvonar et al. ............. 702/130 |
| 5,829,876 A | * | 11/1998 | Schwartz et al. ............. 374/1 |

(Continued)

FOREIGN PATENT DOCUMENTS

DE 102 20 911 A1 12/2003

(Continued)

*Primary Examiner*—Gail Verbitsky
(74) *Attorney, Agent, or Firm*—Oliff & Berridge, PLC

(57) ABSTRACT

There are a number of sensors (2, 22) such as thermocouples which can provide a putative measurand signal which is within a predicted range for such signals whilst the sensor is incorrectly operating, such as as due to an open circuit. Techniques and processes are available to determine by interrogation sensor operational validity, but these can distort the measurand signal if correct. By time division multiplex techniques the present arrangement takes a putative measurand signal from a sensor (2, 22) in order that either within the same time division or more normally a separate time division, an interrogation of the sensor is performed in order to determine accuracy and therefore validity of the sensor 22. In such circumstances, the putative measurand signal from the sensor 22 is dynamically verified by the interrogator 23 to allow greater confidence with respect to interpretation, if an invalid sensor operation is determined, then a pre-defined value for that sensor failure can be output for the data signal.

10 Claims, 1 Drawing Sheet

U.S. PATENT DOCUMENTS

Figure 1:
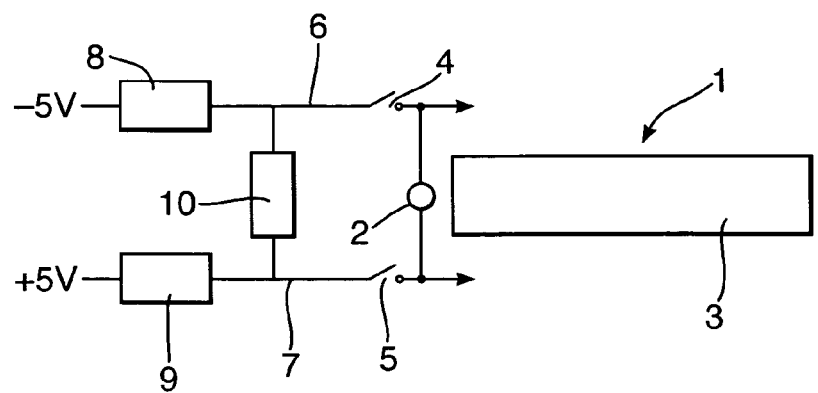

| | | | | |
|---|---|---|---|---|
| 6,045,260 A | * | 4/2000 | Schwartz et al. | 374/183 |
| 6,091,324 A | * | 7/2000 | Arsenault et al. | 340/449 |
| 6,344,747 B1 | | 2/2002 | Lunghofer et al. | |
| 6,772,085 B2 | * | 8/2004 | Watkins et al. | 702/130 |
| 6,854,883 B2 | * | 2/2005 | Rund et al. | 374/208 |
| 7,145,463 B2 | * | 12/2006 | Olsen | 340/585 |
| 2002/0042694 A1 | | 4/2002 | Henry et al. | |
| 2009/0268779 A1 | * | 10/2009 | Hotta et al. | 374/179 |

FOREIGN PATENT DOCUMENTS

| | | |
|---|---|---|
| EP | 0 586 942 A1 | 3/1994 |
| EP | 1462 769 A2 | 9/2004 |
| GB | 2 263 975 A | 8/1993 |
| GB | 2 379 022 A | 2/2003 |
| JP | A 3-156981 | 7/1991 |
| WO | WO 02/088850 A1 | 11/2002 |
| WO | WO 2004/025223 A3 | 3/2004 |

\* cited by examiner

SENSOR MEASUREMENT ERROR

The present invention relates to sensor measurement error, and more particularly to thermocouples utilised within a gas turbine engine in order to determine engine performance.

It will be appreciated during development, as well as operation of machinery such as gas turbine engines, it is necessary to measure a relatively large number of component and gas flow temperatures. These measurements may be with regard to both rotating and static features within an engine or other machinery. In view of the number of measurements required and therefore the number of sensors for those measurements to be provided, it is normal to utilise thermocouples. Typically, signals from the thermocouples are processed and digitised appropriately and then transmitted to a processing device in order to provide a database by which engines or other machinery operation can be assessed.

It will be appreciated if the thermocouples are operating under normal circumstances, then relatively accurate representations of the measured temperatures are received by the storage and processing features of the machinery or engine testing arrangement. However, if a thermocouple sensor fails by going open circuit, the result will be spurious and undefined. However and importantly, the spurious result from the thermocouple will not readily be apparent and therefore the processing device may consider the results from that failing thermocouple sensor as good measurement data. Even if identified as incorrect, ignoring the results may undermine the comparative value of good measurements.

It will be understood by the nature of an open circuit thermocouple being undefined in terms of its results it is possible that the open circuit thermocouple in failure will give results which are similar to accurately working thermocouples. It will be appreciated that by the term open circuit it is meant that the results from the thermocouple are as a result of the open circuit rather than thermo differences about the thermocouple.

Previously, in order to alleviate the simple inability to determine the difference between a failing open circuit thermocouple and a good thermocouple, two approaches have been taken. Firstly, it has been known to interrupt the measurement process in order to establish by various means thermocouple integrity. In short, the thermocouple is interrogated by an interrogation device including comparing the responses to thermocouples which should have some intrinsic link or simply running a test procedure for the thermocouple whilst normal measurements, as indicated, are interrupted. A second method involves injecting signals at a point where an electrical circuit to the thermocouple is made. In such circumstances, there is an obvious manifestation that an open circuit event has occurred when an electrical current flows through the thermocouple circuit, rather than through the thermocouple which being open circuit will effectively have a higher resistance compared to the thermocouple circuit. However, with this second approach, there may be an error due to the injected current adversely affecting the measurement requirements during normal operation. In such circumstances, the alternatives are to interrupt measurement in accordance with the first approach to essentially isolate the thermocouple to allow specific testing, or alternatively provide a monitoring thermocouple circuit which by its nature may distort the results of the thermocouple itself during normal operation. In such circumstances, neither prior approach provides a completely non-intrusive means for detecting an open circuit condition within a compromised sensor such as a thermocouple In accordance with a first aspect of the present invention there is provided a method of determining thermocouple integrity the method uses a measurement arrangement comprising a thermocouple, a controller/processor, a multiplexer/digitiser and a test circuit; the method is characterised by the steps;

(a) the controller/processor taking a temperature reading from the thermocouple,
(b) the controller/processor switching the multiplexer/digitiser to allow the test circuit to stimulate the thermocouple to provide a test reading,
(c) interrogating the test reading to check for the thermocouple being closed or open circuit and
(d) accepting or rejecting respectively the temperature reading.

Preferably, the measurement arrangement comprises a plurality of thermocouples, the method comprising taking the temperature reading and test reading of each thermocouple in sequence.

Preferably, the method comprises taking the temperature reading and test reading of the or each thermocouple in a predetermined time period.

Also, in accordance with the present invention, there is provided a thermocouple integrity measurement arrangement characterised by the arrangement comprising a thermocouple, a controller/processor, a multiplexer/digitiser and a test circuit, the controller/processor is arranged to receive a temperature reading from the thermocouple and to switch the multiplexer/digitiser to the test circuit, the test circuit capable of inputting a test signal to the thermocouple for the controller/processor to receive the test reading, the controller/processor is capable of determining whether the test reading is indicative of a closed or open circuit and accepting or rejecting respectively the temperature reading.

Preferably, the measurement arrangement comprises a plurality of thermocouples, the arrangement capable of taking the temperature reading and test reading of each thermocouple in sequence.

Preferably, the controller/processor takes the temperature reading and test reading of the or each thermocouple in a predetermined time period.

Any embodiment of the present invention will now be described by way of example and with reference to the accompanying drawings in which:—

Figure 2:
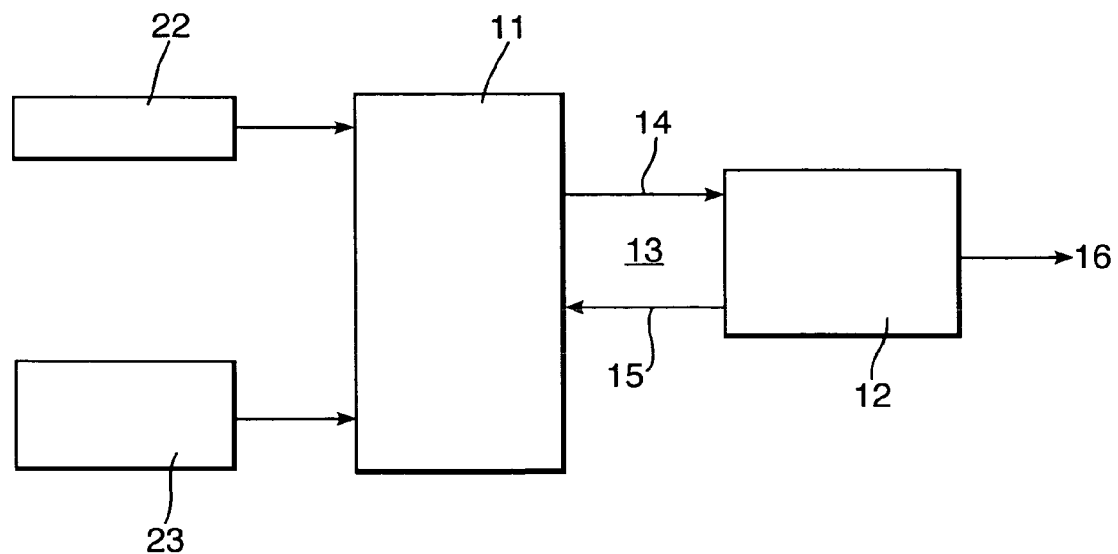

FIG. 1 is a schematic representation of a circuit in order to test a thermocouple sensor; and, FIG. 2 is a schematic illustration of a measurement arrangement in accordance with the present invention.

As indicated above, the particular problem with sensors such as thermocouples is that when the sensor has failed, such as a result of an open circuit, a measurand signal indicative of temperature or other measurement may be provided which is within the acceptable range for that sensor and therefore indistinguishable from a true measurand signal. Unfortunately, there are generally a large number of sensors within a sensor group utilised within a machine such as an engine and therefore failure of one sensor may not be readily noticeable. Nevertheless, it is important for accuracy, particularly when developing engine designs to provide reliable results with respect to sensor measurements.

The present arrangement utilises time division multiplex interrogation of each sensor in a sensor group. By time division it is meant that each sensor is individually addressed in a time division in order to determine a sensor measurand result. These sensors effectively take turns in being interrogation by a processor and controller. The time division is generally in the order of a few fractions of a second, such that there is sufficient time for a measurand signal to be received from a sensor as well as a validity test performed dynamically. In accordance with the present arrangement, a putative signal is received from a sensor and then the sensor interrogated in order to determine whether the sensor is operating efficiently. In short, the sensor will generally be at least tested for open circuit detection, which as indicated above may provide a received signal to the processor/controller which is within a predictable range for the sensor and so difficult to distinguish purely from the received signal value with any degree of inaccuracy.

FIG. 1 provides a schematic illustration of an individual measuring arrangement 1 in accordance with the present invention. Thus, a sensor 2 is generally arranged so that a processor/controller device (not shown) and an open circuit detection device 3 is switchable through switches 4, 5 into connection with the sensor 2 in order to determine an open circuit. In short, an electrical current is passed along rails 6, 7, such that if the sensor, such as a thermocouple, is operating correctly, electrical resistances 8, 9, as well as that of the sensor 2 will be predictable relative to a shunt resister 10 and the test circuit 3 should therefore receive a predictable result based upon the value of the resistor 10. However, if there is an open circuit a significantly different result will be achieved and noted by the test circuit 3, indicating that the sensor 2 is malfunctioning. As indicated above, generally that malfunction will be through an open circuit which will manifest itself in an inbalance between the rails 6, 7, noticed by the circuit 3.

It will be appreciated that the switches 4, 5 will generally be electronic and therefore fast. In such circumstances within a time frame both a putative signal from the sensor 2 as well as a test on that sensor 2 can be performed. In such circumstances, dynamic verification of the putative measurand signal from the sensor 2 may be achieved for subsequent processing and analysis by a processor/controller in accordance with desired objectives in terms of interpretation of sensor variants.

FIG. 2 provides a schematic illustration of a measurement arrangement in accordance with the present invention. Thus, sensors in the form of thermocouples 22 are connected to a multiplexer/digitizer 11 for the arrangement. The multiplexer/digitizer is also coupled to a sensor test circuit 23. The purpose of the multiplexer/digitizer 11 is to allow time division multiplex communication between the thermocouples 22 and a controller/processor device 12 through a two way communication box 13 in which data can be transferred in the direction 14, whilst control signals are sent in the direction 15. The processor/controller 12 finally outputs data 16, which is verified as accurate, that is to say when the measurand signal as received from a thermocouple or sensor 22 in a group of thermocouples or sensors is verified as correct by the circuit test interrogator 23. In terms of operation, the controller/processor 12 will operate the multiplexer/digitizer 11 in such a manner that each sensor in the group of sensors 22 will be individually addressed in a time division in order to extract data. It will be appreciated in some circumstances sensors in the group of sensors 22 may be rendered inoperative for whatever reason such that the controller 12 in such circumstances will only address active sensors 22 in the sensor group. Nevertheless, each sensor 22 will provide a putative signal indicative of the tested measurand subject to that sensor 22. As indicated, this putative signal may be inaccurate through a malfunction in sensor 22. In such circumstances, the controller 12 upon receipt of a putative signal from a sensor 22 through the time division multiplexer 11 activates the interrogator 23 in order to investigate the operability with regard to the subject sensor 22 and its validity. As indicated, this will generally take the form of an open circuit test utilising an injected electrical current into the sensor. Whilst the interrogation is performed by the interrogator 23 the putative signal received from the sensor 22 is generally held within a temporary register within the controller/processor 12.

The interrogation process with respect to a sensor will be relatively fast. Generally, interrogation will be arranged to occur within the same time division as the putative measurand signal if possible. However, more typically a time division within the sensor repeat sweep time frame will be allocated to the interrogator 23 in order to determine whether the sensor 22 is operating correctly. Thus, if the interrogator 23 determines that the sensor 22 is operating correctly then the putative measurand signal received by the controller/processor 12 will be considered a true valid measurand signal and output as data 16. As indicated above this will normally be released from a temporary register. However, if the interrogator 23 determines that a subject sensor 22 is malfunctioning, then an error flag will be raised and notified to the controller/processor 12. In such circumstances, the putative measurand signal held in the temporary register within the control/processor can be dealt with in a number of ways, including simple deletion or submission to an error store for subsequent analysis in terms of the potential error in the subject sensor 22.

If the putative measurand signal received by the controller/processor 12 is ignored, there may be a "hole" in the analysis results. In such circumstances, particularly where a statistical analysis of a number of sensors 22 within a group of sensors is to be utilised, a pre-determined set sensor value may be utilised and output from a simple lock up store as data 16. This pre-determined value may be fixed or determined through extrapolation from sensors 22 adjacent or otherwise potentially indicative of the sensor 22 value in its location within a tested machine or engine.

In view of the above, it will be appreciated the multiplexer/digitizer 11 dynamically selects and digitises all sensors 22, i.e. thermocouple inputs and these are then transferred in the data direction 14 to the controller/processor 12. The controller/processor 12 then formats the data signals 14 and provides output 16 for appropriate analysis. In accordance with the present invention, in addition to this simple time division process, the sensors 22 as thermocouples are scanned and interrogated by an interrogator 23 and this provides additional validation information as data signals, again for the data path 14 to the controller/processor 12. In such circumstances, in accordance with the present invention, this interrogation process by an interrogator 23 as a validity test is taken dynamically with the signals from the sensor 22. As indicated above, there are a number of ways of detecting validity with respect to sensor 22 operation and in particular with respect to open circuit conditions within sensors 22 and each of these can be utilised provided the necessary speed of response is achieved.

In accordance with the present measurement arrangement, the provision of dynamic information with respect to the sensor 22 in terms of operational performance are utilised in order to control the data 16 output by the controller/processor 12. For a good sensor, that is to say thermocouple operation, then the putative measurand signal received from the sensor 22 is utilised by the controller/processor 12 in order to provide the output data for that sensor 22. However, if that sensor 22 malfunctions such as through an open circuit as identified by the interrogator 23, then a pre-determined definitive value for that invalid operation of the sensor 22 overrides the erroneous putative measurand signal received. If the interrogator 22 is relatively sophisticated then dependent upon the invalidity flag signal raised by the interrogator 23, it will be appreciated that as indicated above difference pre-determined definitive values for invalidity of the sensor may be provided as output data 16, dependent upon the manner of failure of the sensor 22 determined by the interrogator 23.

With regard to the present invention there is a relatively quick detection of sensor failure and in particular with regard to thermocouples. As indicated above, it is possible that some interrogation techniques with regard to determining sensor malfunction may themselves distort the actual measurand signal received. Interrogation of a thermocouple can occur in a separate time division when the sensor is not being addressed or providing measurand signals, thus sensor induced causes of error are eliminated and there is minimal or zero loss of accuracy with regard to valid measurand signals.

As indicated above, ideally there should be as little distortion and interruption in normal valid measurand signal acquisition. In such circumstances, the interrogation process with regard to a sensor can be carried out at any rate and time convenient to the time division scanning of the sensors such as thermocouples. In such circumstances, an interrogation process may be carried out upon each sensor in a group during a scan time frame during a frame synchronisation period when there is no data acquisition. In such circumstances, each sensor in a group of sensors may be tested in sequence with one sensor interrogated in turn during a sequence of time frames in a repetitive cycle. Such an approach will minimise disruption in sensor scan rates at the potential cost of a slight increase in sensor error detection time. In any event, it will be appreciated that the sensor results received between interrogations may be retrospectively ignored for interpretational purposes. It will also be understood that if there is the potential for the interrogation process to interfere with valid acquisition of measurand signals from properly operating sensors, then faulty sensors may be dynamically switched off or on dependent upon their integrity to reduce any possibility of interference with valid signals received from properly operating sensors.

As indicated above, the present arrangement can be utilised with respect to thermocouples which may be subject to open circuit failure. However, other types of sensors such as stress and/or pressure sensors can also be subject to the present measurement arrangement where each sensor provides a putative measurand signal in a time division multiplex scan cycle.

The present invention is therefore summarised as a method of determining thermocouple integrity the method uses a measurement arrangement (1) comprising a thermocouple (22), a controller/processor (12), a multiplexer/digitiser (11) and a test circuit (23); the method is characterised by the steps; (a) the controller/processor (12) taking a temperature reading from the thermocouple (22), (b) the controller/processor (12) switching the multiplexer/digitiser (11) to allow the test circuit (23) to stimulate the thermocouple (22) to provide a test reading, (c) interrogating the test reading to check for the thermocouple (22) being closed or open circuit and (d) accepting or rejecting respectively the temperature reading. Preferably, the method is used where the measurement arrangement (1) comprises a plurality of thermocouples (22), the method comprising taking the temperature reading and test reading of each thermocouple (22) in sequence. The method importantly comprises taking the temperature reading and test reading of the or each thermocouple (22) in a predetermined time period.

Another aspect of the present invention is also summarised as a thermocouple integrity measurement arrangement (1) comprising a thermocouple (22), a controller/processor (12), a multiplexer/digitiser (11) and a test circuit (23), the controller/processor (12) is arranged to receive a temperature reading from the thermocouple (22) and to switch the multiplexer/ digitiser (11) to the test circuit (23), the test circuit (23) capable of inputting a test signal to the thermocouple (22) for the controller/processor (12) to receive the test reading, the controller/processor (12) is capable of determining whether the test reading is indicative of a closed or open circuit and accepting or rejecting respectively the temperature reading. Similarly, the thermocouple integrity measurement arrangement (1) preferably is used where there is a plurality of thermocouples (22), the arrangement capable of taking the temperature reading and test reading of each thermocouple (22) in sequence. The controller/processor (12) takes the temperature reading and test reading of the or each thermocouple (22) in a predetermined time period.

I claim:

1. A method of determining thermocouple integrity with a measurement arrangement comprising a thermocouple, a controller or processor, a digital multiplexer and a test circuit; the method comprising:
   (a) the controller or processor taking a temperature reading from the thermocouple using a first circuit,
   (b) the controller or processor switching on or off the digital multiplexer,
   (c) the controller or processor receiving a signal utilizing the first circuit that is indicative of the temperature reading from the thermocouple,
   (d) the controller or processor activating the test circuit upon receipt of the signal in order to determine validity of the signal,
   (e) the test circuit, upon being activated by the controller or processor, sending an electric current to the thermocouple via a second circuit that is switched on and off to provide a test reading,
   (f) interrogating the test reading to check for the thermocouple being a closed or an open circuit to determine thermocouple integrity and the validity of the signal, and
   (g) accepting or rejecting respectively the temperature reading taken by the controller or processor by:
      predicting a result of the electric current passed along rails of the second circuit through the thermocouple and electrical resistances;
   interrogating the test reading; and
   if the result of the electric current is correctly predicted, the temperature reading taken by the controller or processor is accepted.

2. The method of claim 1 wherein the measurement arrangement comprises a plurality of thermocouples, the method further comprising taking the temperature reading and test reading of each thermocouple in sequence.

3. The method of claim 1 further comprising taking the temperature reading and test reading of the thermocouple in a predetermined time period.

4. The method of claim 2 wherein switching on or off the digital multiplexer causes faulty thermocouples to be dynamically switched on or off depending on their integrity to reduce any possibility of interference with valid signals received from properly working thermocouples.

5. The method of claim 1 wherein once the testing circuit is activated, the testing circuit is only electrically connected to the thermocouple by switching the second circuit on long enough to obtain the test reading, and the second circuit is switched off when the testing circuit is not activated.

6. A thermocouple integrity measurement arrangement comprising:
   a thermocouple;
   a controller or processor;
   a digital multiplexer; and
   a test circuit, the controller or processor being arranged to receive a signal that is indicative of a temperature reading from the thermocouple via a first circuit and to switch on or off the digital multiplexer to the test circuit, the controller or processor being arranged further to activate the test circuit upon receipt of the signal in order to determine validity of the signal, the test circuit, upon being activated by the controller or processor, is arranged to input a test signal via a second circuit that is switched on and off to stimulate the thermocouple for the controller or processor to receive a test reading, the controller or processor arranged to determine whether the test reading is indicative of a closed or an open circuit, which is further indicative of the thermocouple integrity and the validity of the signal, and accepting or rejecting respectively the temperature reading, the controller or processor is further arranged to predict a result of electric current passed along rails of the second circuit through the thermocouple and electrical resistances in order to determine whether the test reading is indicative of the closed or the open circuit, and if the result of the electric current is correctly predicted, the temperature reading taken by the controller or processor is accepted.

7. A thermocouple integrity measurement arrangement according to claim 6 further comprising a plurality of thermocouples, the arrangement being capable of taking the temperature reading and test reading of each thermocouple in sequence.

8. A thermocouple integrity measurement arrangement according to claim 6 wherein the controller or processor takes the temperature reading and test reading of the thermocouple in a predetermined time period.

9. A thermocouple integrity measurement arrangement according to claim 7 wherein switching on or off the digital multiplexer causes faulty thermocouples to be dynamically switched on or off depending on their integrity to reduce any possibility of interference with valid signals received from properly working thermocouples.

10. The thermocouple integrity measurement arrangement according to claim 6, wherein once the testing circuit is activated, the testing circuit is only electrically connected to the thermocouple by the second circuit when a switch is switched on long enough to obtain the test reading, and the second circuit is switched off via the switch when the testing circuit is not activated.

* * * * *